United States Patent
Bayer et al.

(10) Patent No.: US 10,673,991 B2
(45) Date of Patent: Jun. 2, 2020

(54) METHOD AND SYSTEM FOR THE SCHEDULING OF PACKETS IN A BUNDLING SCENARIO BASED ON TCP TUNNELS AND NATIVE TCP INFORMATION

(71) Applicant: Deutsche Telekom AG, Bonn (DE)

(72) Inventors: Nico Bayer, Bad Nauheim (DE); Ammar Ghazzawi, Erzhausen (DE)

(73) Assignee: DEUTSCHE TELEKOM AG, Bonn (DE)

(*) Notice: Subject to any disclaimer, the term of this patent is extended or adjusted under 35 U.S.C. 154(b) by 24 days.

(21) Appl. No.: 15/564,443

(22) PCT Filed: Apr. 8, 2016

(86) PCT No.: PCT/EP2016/057795
§ 371 (c)(1),
(2) Date: Oct. 5, 2017

(87) PCT Pub. No.: WO2016/162501
PCT Pub. Date: Oct. 13, 2016

(65) Prior Publication Data
US 2018/0077267 A1    Mar. 15, 2018

(30) Foreign Application Priority Data
Apr. 10, 2015   (EP) .................................... 15163169

(51) Int. Cl.
*H04L 29/06* (2006.01)
*H04L 12/26* (2006.01)
(Continued)

(52) U.S. Cl.
CPC ........ *H04L 69/161* (2013.01); *H04L 12/2856* (2013.01); *H04L 12/4633* (2013.01); *H04L 12/5602* (2013.01); *H04L 43/087* (2013.01)

(58) Field of Classification Search
CPC ............. H04L 12/2856; H04L 12/4633; H04L 12/5602; H04L 69/161; H04L 43/087
See application file for complete search history.

(56) References Cited

U.S. PATENT DOCUMENTS 8,699,490 B2 * 4/2014 Zheng ................. H04L 12/2856
370/352
9,106,787 B1 * 8/2015 Holmer ................. H04L 43/087
(Continued)

FOREIGN PATENT DOCUMENTS

| JP | 2007243447 A | 9/2007 |
| JP | 2015050746 A | 3/2015 |
| WO | WO 2009019258 A1 | 2/2009 |

*Primary Examiner* — Joshua D Taylor
(74) *Attorney, Agent, or Firm* — Leydig, Voit & Mayer, Ltd.

(57) ABSTRACT

A system for packet-based scheduling for Transmission Control Protocol (TCP) sessions or User Datagram Protocol (UDP) sessions includes: a first bonding module comprising a first scheduling module and at least two access interfaces connected to at least one transport network, wherein the first bonding module is configured to be connected to a user device, wherein a TCP tunnel is configured via each of the access interfaces which terminates at a second bonding module, and wherein the first scheduling module is configured to schedule and distribute data packets via the TCP tunnels towards the second bonding module. The second bonding module comprises a second scheduling module and at least one access interface connected to each of the at least one transport network, wherein the second bonding module is configured to be connected to a server and to schedule and distribute data packets via the TCP tunnels towards the first bonding module.

15 Claims, 4 Drawing Sheets

(51) Int. Cl.
*H04L 12/54* (2013.01)
*H04L 12/28* (2006.01)
*H04L 12/46* (2006.01)

(56) References Cited

U.S. PATENT DOCUMENTS

| | | |
|---|---|---|
| 2002/0010866 A1 | 1/2002 | McCullough et al. |
| 2004/0190449 A1* | 9/2004 | Mannal .................. H04L 47/10 370/229 |
| 2005/0025052 A1* | 2/2005 | Zhao .................. H04L 12/5602 370/230 |
| 2011/0296006 A1* | 12/2011 | Krishnaswamy ....... H04L 45/00 709/224 |
| 2012/0039173 A1 | 2/2012 | Danzig et al. |
| 2016/0043969 A1* | 2/2016 | Sung .................... H04L 47/825 370/392 |
| 2016/0099865 A1* | 4/2016 | Klincewicz ............. H04L 45/28 370/218 |

\* cited by examiner

METHOD AND SYSTEM FOR THE SCHEDULING OF PACKETS IN A BUNDLING SCENARIO BASED ON TCP TUNNELS AND NATIVE TCP INFORMATION

CROSS-REFERENCE TO RELATED APPLICATIONS

This application is a U.S. National Phase application under 35 U.S.C. § 371 of International Application No. PCT/EP2016/057795, filed on Apr. 8, 2016, and claims benefit to European Patent Application No. EP 15163169.4, filed on Apr. 10, 2015. The International Application was published in English on Oct. 13, 2016 as WO 2016/162501 A1 under PCT Article 21(2).

FIELD

The present invention relates to a method and a system for resource bundling using packet-based scheduling for Transmission Control Protocol (TCP) sessions or User Datagram Protocol (UDP) sessions.

BACKGROUND

In the past much effort has been put in approaches for resource bundling which can be roughly grouped into: session/application-, transport-, network- and link-layer approaches. In the following the most important examples for each of these groups will be briefly discussed.

The HTTP range request is a session/application-layer feature which can also be used to perform resource bundling. This feature divides the content to download into slices which are then downloaded in separate TCP sessions over different interfaces. This feature is implemented within the Samsung Galaxy S5 and called "Network Booster" (S. E. Corporation, "Network booster—for enhanced data performance," Techpaper).

The most prominent example of a transport-layer solution is Multipath TCP (MPTCP) specified by the Internet Engineering Task Force (IETF) in Request for Comment (RFC) 6824 (A. Ford, C. Raiciu, M. Handley, and O. Bonaventure, "Tcp extensions for multipath operation with multiple addresses," RFC, no. 6824, January 2013). MPTCP can be seen as an extension of TCP which allows the simultaneous usage of multiple paths between peers transparent for the application. MPTCP is already used in commercial products like the iPhone. The Siri service for instance uses MPTCP to increase reliability. In case the iPhone has a cellular and a Wi-Fi connection Siri initiates two sessions one over Wi-Fi and one over the cellular network. If one of the connections becomes unavailable or unreliable, the backup connection is immediately available.

Another transport-layer example is Stream Control Transmission Protocol (SCTP) (R. Stewart et al., "Stream Control Transmission Protocol," RFC 2960 (Proposed Standard), Internet Engineering Task Force, October 2000, obsoleted by RFC 4960, updated by RFC 3309). One of the advantages of SCTP is its multi-homing feature which in principle also enables the bundling of links.

In principle it can be stated that the session/application layer approaches as well as the transport layer approaches are suited for end-to-end (E2E) scenarios as the bundling is performed by the end-devices without any special involvement of the network. The drawback of E2E approaches is the effort of introducing the technology as it must be supported by the user devices as well as the Internet servers.

Network-layer approaches are the preferred solution for network operators as they can easily be implemented without the need to change the end-devices. Instead proxy servers are used, which are under the control of the operator and which perform the bundling transparent to the end devices.

Link-layer bundling refers to the bundling of multiple channels of equal technology. Examples are the bundling of Ethernet links defined in IEEE 802.3ad (WO 2009/019258 A1) and the bundling of Wi-Fi channels for instance implemented in the Atheros SuperG mode. The SmartAP solution proposed in (E. G. Llairo and D. Giustiniano, "Smartap: Practical wlan backhaul aggregation." in Wireless Days. IEEE, 2013, pp. 1-7) deals with the aggregation of Wireless Local Area Network (WLAN) backhaul using single-radio multi-channel visualisation. This allows connections with multiple neighbouring Access Points (APs) even if different channels are used. D. Giustiniano, E. Goma, A. Lopez Toledo, I. Dangerfield, J. Morillo, and P. Rodriguez, "Fair wlan backhaul aggregation," in Proceedings of the Sixteenth Annual International Conference on Mobile Computing and Networking, ser. MobiCom '10. New York, N.Y., USA: ACM, 2010, pp. 269-280 investigates fairness in the described system.

SUMMARY

In an exemplary embodiment, the present invention provides a system for packet-based scheduling for Transmission Control Protocol (TCP) sessions or User Datagram Protocol (UDP) sessions. The system includes: a first bonding module comprising a first scheduling module and at least two access interfaces connected to at least one transport network, wherein the first bonding module is configured to be connected to a user device, wherein a TCP tunnel is configured via each of the access interfaces which terminates at a second bonding module, and wherein the first scheduling module is configured to schedule and distribute data packets via the TCP tunnels towards the second bonding module; and/or the second bonding module comprising a second scheduling module and at least one access interface connected to each of the at least one transport network, wherein the second bonding module is configured to be connected to a server, and wherein the second scheduling module is configured to schedule and distribute data packets via the TCP tunnels towards the first bonding module.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
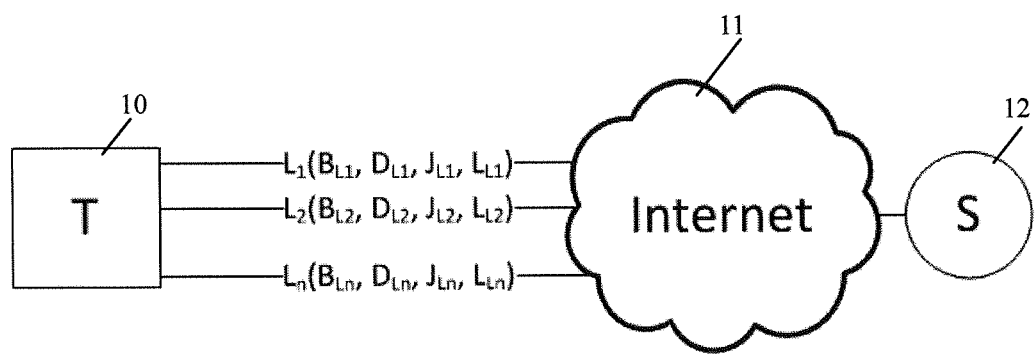
FIG. 1 illustrates an example of a multi-homed terminal according to the prior art.

Exemplary embodiments of the present invention provide a method and a system for packet-based scheduling for Transmission Control Protocol (TCP) sessions or User Datagram Protocol (UDP) sessions having an improved performance.

The present invention provides a generic bundling architecture preferably suited for network operators. However, the present invention is also suited for Over-the-top (OTT) content scenarios. In contrast to other approaches, the present invention uses TCP tunnels to reduce the complexity of the system and to provide high bundling gains. Path monitors as like in traditional bundling solutions are not required. Instead native information coming from the TCP tunnels is used as input for packet schedulers in order to decide about the most efficient packet scheduling. That is, an innovative solution is described, which is able to determine the weights for the scheduling approach in order to maximize bundling gain. In other words the TCP tunnels and in particular the native information from the TCP tunnels may be used to estimate the bandwidth available via each tunnel. This information is used for an efficient mapping of data packets to the available tunnels. According to the present invention different tunnels might go over different network interfaces, e.g. WiFi and 3GPP, wherein the available bandwidth via each tunnel might be significantly different. The present invention provides an efficient bandwidth aggregation by considering the available bandwidth via each of the tunnels.

According to a first aspect of the present invention a system for packet-based scheduling for Transmission Control Protocol (TCP) sessions or User Datagram Protocol (UDP) sessions is provided. The system comprises a first bonding module comprising a first scheduling module and at least two access interfaces connected to at least one transport network, wherein the first bonding module can be connected to a user device, wherein a TCP tunnel is configured via each of the access interfaces which terminates at a second bonding module, and wherein the first scheduling module is configured to schedule and distribute data packets via the TCP tunnels towards the second bonding module, preferably over the internet. The system might further comprise, alone or in combination, the second bonding module comprising a second scheduling module and at least one access interface connected to each of the at least one transport network, wherein the second bonding module can be connected to a server, and wherein the second scheduling module is configured to schedule and distribute data packets via the TCP tunnels towards the first bonding module.

It is preferred that the data packets are distributed on the network-layer (layer 3). This allows for making use of standard TCP protocols. Accordingly, no new TCP protocol may be required.

The system might further comprise a first router connected to the first bonding module through a wired or wireless connection, wherein preferably the first router is configured to receive and send data from/to the user device.

The system might also comprise a second router connected to the second bonding module through a wired or wireless connection, wherein preferably the second router comprises a Network Address Translation module that is preferably configured to receive and send data from/to the server.

The first router might be multihomed, meaning that the first router is connected to the internet via at least two interfaces. Both routers (first and second router) might belong to different networks and are connected to each other via the TCP tunnels. The number of TCP tunnels between both routers is based on the number of interfaces with which the first router is connected to the internet. Via each of these interfaces one tunnel is used.

It is recognized that the term "connected" can also mean that a certain module is a part of the respective module it is connected to, i.e. the modules can be connected internally. For example, the first and/or second bonding module might be an integral part of the user device and/or the server, respectively. As another example, the first and/or second bonding module might be an integral part of the first and/or second router, respectively.

Preferably, the first and/or second scheduling module is configured to obtain the capacity of the TCP tunnels between the first router and the second router based on native information from the TCP tunnels. This information is used to decide about the scheduling weight for each of the TCP tunnels.

Moreover, the native information of the TCP tunnels might comprise at least one of the following: size of the Congestion Window Ccwnd, a TCP slowstart threshold Sthresh, a smoothed Round Trip Time TRTT, a number of packets that have been send out Pout, a number of packets that have been acknowledged Psacked, a number of packets that have been re-transmitted Pretrans, and a number of packets considered to be lost Plost. Alternatively or additionally a sender queue size of the TCP tunnel interfaces can be taken into account as a further parameter.

According to a further aspect of the present invention, the first and/or second scheduling module is configured to obtain for each tunnel a number of packets currently travelling from the first router to the second router as $P_{fly}=P_{out}-P_{sacked}+P_{retrans}-P_{lost}$.

More preferably, the first and/or second scheduling module is configured to obtain a leftover capacity as $C_{left}=C_{cwnd}-P_{fly}$.

Even more preferably, the first and/or second scheduling module is configured to obtain changes of the leftover capacity $\Delta C_{left}$ within a defined interval.

However, it is to be understood that the above list of parameters is not exhaustive in that other parameters can be obtained and used for realizing the same effects of the present invention, which will be understood by a person skilled in the art.

According to a further aspect of the present invention, the first and/or second scheduling module is configured to use a scheduling algorithm to calculate scheduling weights for the TCP tunnels between the first router and the second router.

Preferably, the scheduling weights comprise the ratio of packets sent over each of the tunnels and/or the amount of packets sent over each one of the tunnels in a row.

In addition, the first and/or second scheduling module might be configured to adapt scheduling weights continuously and/or in timeslots.

Preferably, the first and/or second scheduling module might be configured to adapt scheduling weights of a subsequent timeslot based on parameters collected during a previous timeslot.

According to a second aspect of the present invention a method for packet-based scheduling for Transmission Control Protocol sessions, preferably using a system as described above is provided. The method comprises the steps of: (a) connecting a first bonding module comprising a first scheduling module and at least two access interfaces connected to at least one transport network, wherein the first bonding module can be connected to a user device; (b) configuring a TCP tunnel via each of the access interfaces which terminates at a second bonding module; (c) scheduling and distributing data packets via the TCP tunnels and the at least one transport network from the first bonding module towards the second bonding module; and/or (d) connecting the second bonding module comprising a second scheduling module and at least one access interface to each of the at least one transport network, wherein the second bonding module can be connected to a server; and (e) scheduling and distributing data packets via the TCP tunnels from the second bonding module towards the first bonding module.

The method might further comprise a step of connecting a first router to the first bonding module through a wired or wireless connection, wherein preferably the first router is configured to receive and send data from/to the user device.

The method might also comprise a step of connecting a second router to the second bonding module through a wired or wireless connection, wherein preferably the second router comprises a Network Address Translation module that is preferably configured to receive and send data from/to the server.

Again it is clear that connecting can mean connecting two separate devices/modules or it can mean connecting a first device/module to a second device/module internally, i.e. the second device/module might be integrated into the first device/module.

Preferably, the method comprises a step of obtaining capacities of each of the at least two TCP tunnels between the first router and the second router based on native information from the TCP tunnels.

In addition, scheduling and distributing data packets might be based on a scheduling algorithm to obtain scheduling weights for the TCP tunnels between the first router and the second router.

The scheduling weights might comprise of the ratio of packets sent over each of the tunnels and/or the amount of packets sent over each of the tunnels in a row.

Preferably, the scheduling weights are adapted continuously and/or in timeslots.

Even more preferably, the scheduling weights of a subsequent timeslot might be based on parameters collected during a previous timeslot.

What is common to the exemplary embodiments is the challenge of scheduling packets over the available links. Bundling the resources of different access networks is a measure to improve throughput and resilience to network failure. However, bundling of access network resources is a challenging task, especially in case of TCP traffic. In particular, challenges when doing access resource bundling are:

The first challenge comes from the fact that the most popular transport protocols used in today's networks are Transmission Control Protocol (TCP) and User Datagram Protocol (UDP) and that these protocols have not been designed to work over multiple links. These protocols assume that packets belonging to the same session are received from only one Internet Protocol (IP) address. However, if multiple access links are used each interface will get a different IP address. To overcome this problem an additional box has been introduced which is performing Network Address Translation (NAT) on behalf of all access links used by the terminal.

The second challenge is related to the scheduling of the packets over the available links. First of all it can be distinguished between two basic types of scheduling approaches: session-based and packet-based. When session-based scheduling is performed packets of a specific session will always be sent over the same link while the sessions are distributed of the available links. For instance packets of session A are sent on Link $L_1$ while the packets of session B are sent over link $L_2$. The session-based approach has several drawbacks. For instance a single session cannot profit from multiple available links. Even in case of multiple sessions to/from the same terminal a bundling gain cannot be guaranteed if the performance of the different links is significantly different. The focus of this invention is on the packet-based scheduling approach in which packets of a single session are distributed over the available links. As the different links might have different characteristics in terms of available bandwidth (B), delay (D), delay jitter (J) and packet loss (L) it may not be sufficient to perform round-robin scheduling in which packets are distributed equally over the available links. Instead, a weighted scheduling is preferred. Especially for TCP sessions theses weights have a significant influence on the end-to-end performance and therefore these weights are preferably determined carefully.

Finally, the challenge of re-ordering packets comes into play when packet-based scheduling is applied. Due to the different characteristics of the different links and due to the fact that packets might travel via completely different routes through the Internet, packets might arrive at the destination in wrong order. Depending on the application this might cause decreased service quality.

Some preferred embodiments are now described with reference to the drawings. For explanation purposes, various exemplary details are set forth.

In principle resource bundling for so called multi-homed terminals 10 which are terminals 10 that are connected to a server 12 in the Internet 11 is made using at least two separate or different links ($L_1, L_2, \ldots, L_n$). An example is shown in FIG. 1.

The terminal 10 is connected to the Internet 11 with multiple lines ($L_1, L_2, \ldots, L_n$). Today's terminals 10 normally only use one of the lines for the communication with a server 12 in the Internet 11. Usually the selection of interfaces to be used is based on a hierarchical policy. Smartphones for example may prefer the Wi-Fi interface over the 3GPP interface while laptops may prefer the Ethernet interface over the Wi-Fi interface. As a result the maximum bandwidth perceived by the terminal is limited to the bandwidth available by the selected network interface even if other links towards the Internet 11 exist. Assuming the possibility of simultaneous usage of all available interfaces (N) the perceived bandwidth per terminal 10 will increase significantly. In an ideal case the overall bandwidth per terminal 10 ($BW_{ideal}$) is simply the sum of the bandwidth provided by each interface ($BW_i$). However, in real implementations it is a bit more difficult and a bundling efficiency (E) of 100% is almost impossible to achieve. Hence, the bandwidth perceived by a terminal 10 (BW) can be expressed as follows:

$$BW = \left(\sum_{i=1}^{N} BW_i\right) E$$

In the following, an architecture for access resource bundling is presented which provides a solution to one or more of the above mentioned challenges. In addition, an innovative solution is presented able to determine the weights for the scheduling approach in order to maximize the bundling gain. First, the overarching architecture is described followed by details of the main challenge the weighted scheduling of packets based on native TCP information.

Figure 2A:
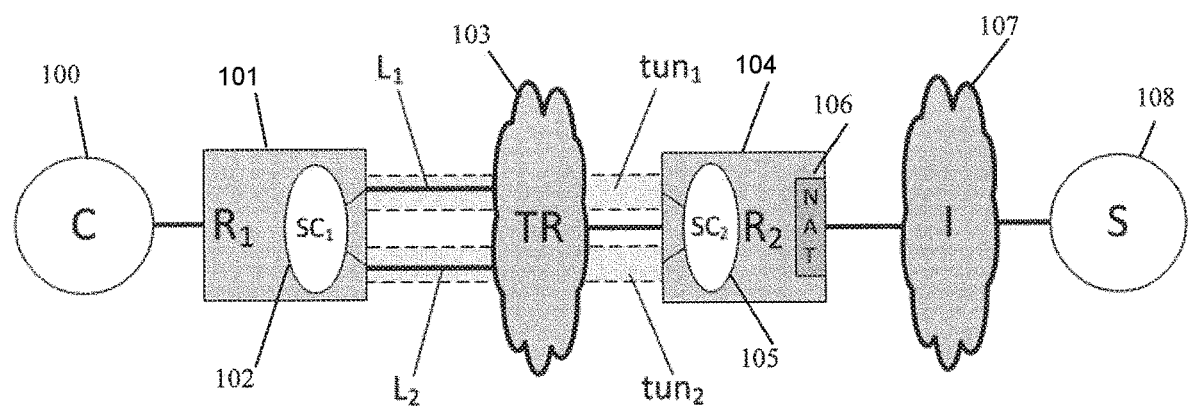
FIGS. 2(a)-(d) illustrate four preferred embodiments of the present invention.

An overview of a solution according to a preferred embodiment of the present invention is illustrated in FIG. 2(a). The node on the left (C) represents the user device 100, e.g. smartphone or laptop, while the device on the right (S) is a server 108 in the Internet (I) 107, e.g. an application server. The user device 100 and the server 108 are standard devices. The bonding intelligence is implemented transparent to them in a first router ($R_1$) 101 and a second router ($R_2$) 104. The first router 101 is the gateway towards the Internet 107 for the user device 100 (e.g. DSL router) and has several access interfaces (here for illustration purpose illustrated with two access interfaces $L_1$ and $L_2$). The second router 104 represents a router within one or more transport networks 103 of the network operator. Both routers 101, 104 connect to each other via the transport network (TR) 103 of the network operator. Via each of the access interfaces $L_1$, $L_2$ used by the first router 101, it configures a respective TCP tunnel ($tun_1$ and $tun_2$) towards the second router 104 for each of the access interfaces $L_1$, $L_2$.

The purpose of these tunnels $tun_1$, $tun_2$ is to transport the data packets between the user device 100 and the server 108. Each of the routers 101, 104 also has a respective scheduling module (SC) 102, 105 implemented. It is to be noted that each of the scheduling modules 102, 105 might be integrated (internally connected) into the respective router 101, 104 to get access to all relevant information in real-time. However, the scheduling module might also be constructed as an external module being simply attached (externally connected) to the router via a wired or wireless connection. In the following the term "connected" is being used for both internally connected (or integrated) and/or externally connected (or attached to). In other words, although FIG. 2(a) shows that the scheduling modules 102, 105 are being integrated into the first and second router 101, 104 respectively, it is also possible to provide these modules 102, 105 as separate devices. The scheduling modules 102, 105 are responsible for the scheduling and distribution of packets via the different tunnel interfaces $tun_1$, $tun_2$. Finally, the second router 104 is using a NAT-module 106 on the interface towards the Internet 107. The combination of each of the scheduling modules 102, 105 and the corresponding interfaces might be called a respective bonding module.

Figure 2B:
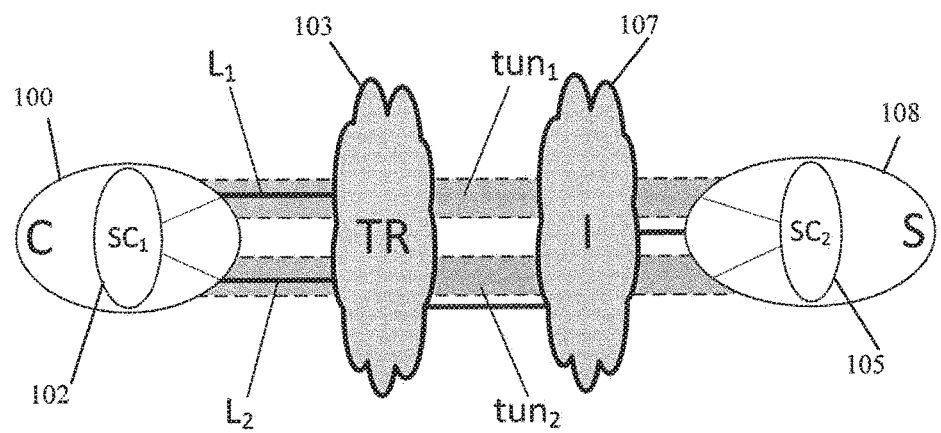
Figure 2C:
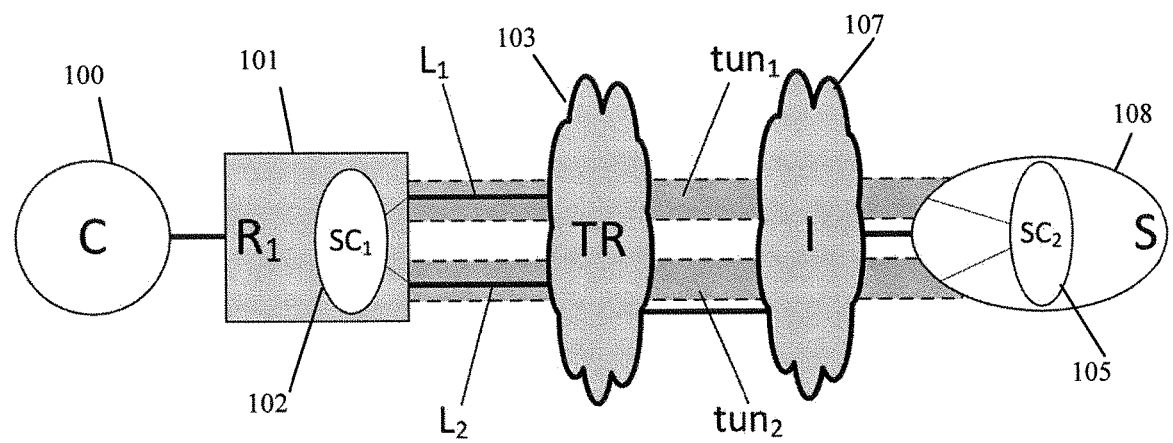
Figure 2D:
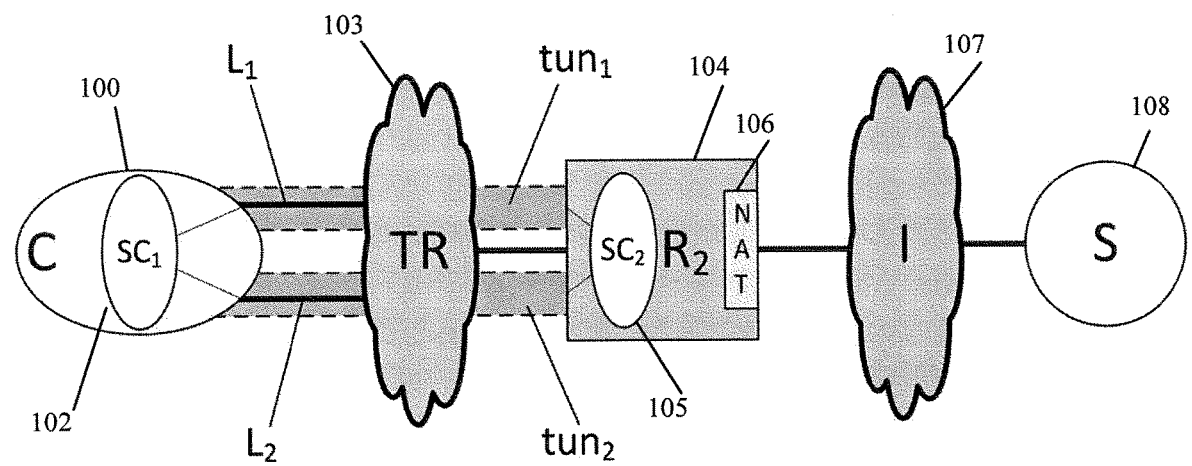

FIG. 2(b) to (d) illustrate further alternative solutions in accordance with the present invention. The components are labeled with corresponding reference signs in accordance with those of FIG. 2(a).

Here, FIG. 2(b) shows an alternative embodiment, wherein the first and second routers 101, 104 are omitted. That is, the scheduling modules 102, 105 are integrated into (connected to) the user device 100 and the server 108 respectively. In this configuration the first bundling is no longer executed at the first router 101 but executed directly at the user device 100 of the user, which comprises of several paths to the internet. Furthermore, the second bundling is no longer executed at the second router 104 but executed directly at the server 108 in the internet.

FIGS. 2(c) and (d) show further variations of the embodiments illustrated by FIGS. 2(a) and (b). In particular, in FIG. 2(c) only the second router 104 is omitted and in FIG. 2(d) only the first router 101 is omitted as compared to the embodiment of FIG. 2(a). It has to be understood that the first and second scheduling modules 102, 105 might be integrated into the user device 100 and the server 108, respectively or provided as separate external devices.

Compared with known approaches as for instance presented in D. Kaspar, "Multipath aggregation of heterogeneous access networks," SIGMultimedia Rec., vol. 4, no. 1, pp. 27-28, March 2012 the present invention has two significant simplifications. First a de-jitter buffer is not used which is responsible for the re-ordering of packets. Instead the re-ordering of packets is left to the native re-ordering algorithm of TCP. That is, the re-ordering is done by the user device 100 or the Internet server 108. Thus, the system profits from the re-ordering done by the user device 100 or the Internet server 108, as it does not require an additional re-ordering module. This simplifies the system compared to other solutions. Second, the path monitor module which is responsible for the determination of link capabilities is not required due to the fact that TCP tunnels $tun_1$, $tun_2$ are used between the first router 101 and the second router 104. Based on information from these tunnels $tun_1$, $tun_2$ the capacity of the links $L_1$, $L_2$ can be estimated.

Thus, the present invention is able to provide a solution to one or more of the challenges mentioned above. NAT is performed at the second router 104, which ensures together with the usage of the tunnels $tun_1$, $tun_2$ that the server 108 always sees the same IP address of the client independent from the path via which the packet has been transmitted. The IP address of the user device 100 seen by the server 108 is the public IP address of the second router 104. Hence, packets from the server 108 to the user device 100 will always be destined to the second router 104. The usage of TCP tunnels $tun_1$, $tun_2$ avoids the requirements of a path monitor module and at the same time provides required information for the scheduling process. The fact that TCP always tries to maximise the bandwidth usage on every tunnel $tun_1$, $tun_2$ based on the adaptation of the Congestion Window ($C_{cwnd}$) is leveraged here. Examples of information available from the TCP tunnels $tun_1$, $tun_2$ are:

The capacity of the link in terms of the size of the $C_{cwnd}$.

The TCP slowstart threshold ($S_{thresh}$)

Smoothed Round Trip Time ($T_{RTT}$) which is the RTT determined/calculated by TCP.

$P_{out}$ which is the number of packets that have been send out.

$P_{sacked}$ which is the number of packets that have been acknowledged.

$P_{retrans}$ which is the number of packets that have been re-transmitted.

$P_{lost}$ which is the number of packets considered to be lost.

Based on these basic parameters additional parameters can be derived, for example:

Packets on the fly ($P_{fly}$) which are the packets send by the sender but which have not yet been acknowledged. So these are the packets currently travelling from the sender to the receiver:

$$P_{fly} = P_{out} - P_{sacked} + P_{retrans} - P_{lost}$$

Leftover capacity ($C_{left}$) which is simply $C_{cwnd} - P_{fly}$ and expresses the number of packets which can be send on the link without waiting for another acknowledgement until its capacity is reached.

Changes of the leftover capacity ($\Delta_{C_{left}}$) within a defined interval.

Scheduling weights (SW) are generally expressed in relations, e.g. (A:B:C:D). In the following example with four available links, the first link has a weight of A meaning that A packets are send over this link before sending packets of the next link, B packets are send over the second link, C packets are send over the third link and finally D packets are send over the fourth link. After that the first link is scheduled again and so on. The scheduling weights (SW) have two characteristics.

The weight ratio ($W_R$) which expresses the ratio of packets sent between the links. For instance, in the case of two links a ratio of 2 means that two times more packets are send over link 1 compared to link 2.

The weight height ($W_H$) which expresses the amount of packets sent over one link in a row. A height of 10 means that 10 packets in a row are sent over link 1.

EXAMPLE $$W_R=2, W_H=10 \rightarrow SW=(10:5).$$

Figure 3:
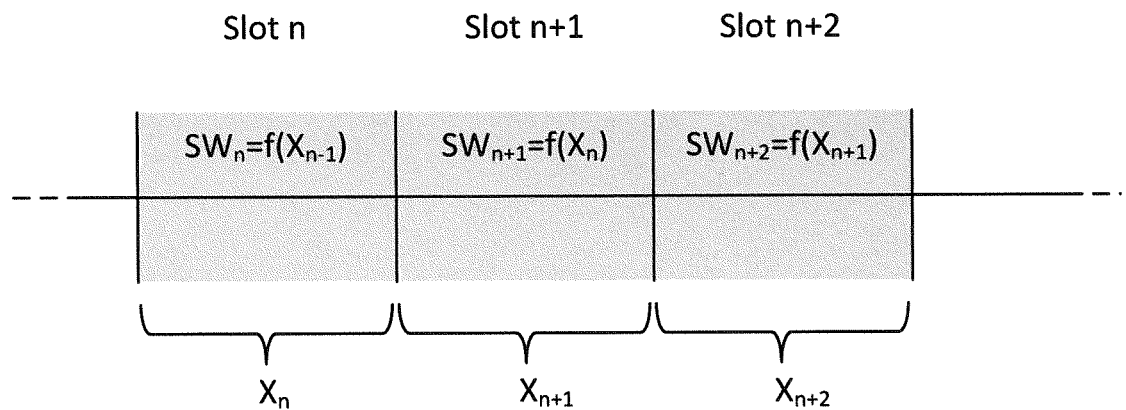
FIG. 3 illustrates adaptation of scheduling weight in slots according to one embodiment of the present invention.

Due to performance reasons, adaptations of the scheduling weights might not be done continuously but in timeslots (e.g. Slot n, Slot n+1, Slot n+2), as shown in FIG. 3. The duration of these timeslots is a parameter ($D_T$). The set of parameters collected during a time slot ($X_n$) are used as input for the scheduling algorithm ($SW_{n+1}=f(X_n)$) for the next time slot $X_{n+1}$. That is, based on these parameters (parameters collected during a time slot) as well as optional input or configuration parameters the scheduling algorithm computes the scheduling weights for the next slot and so on.

Figure 4:
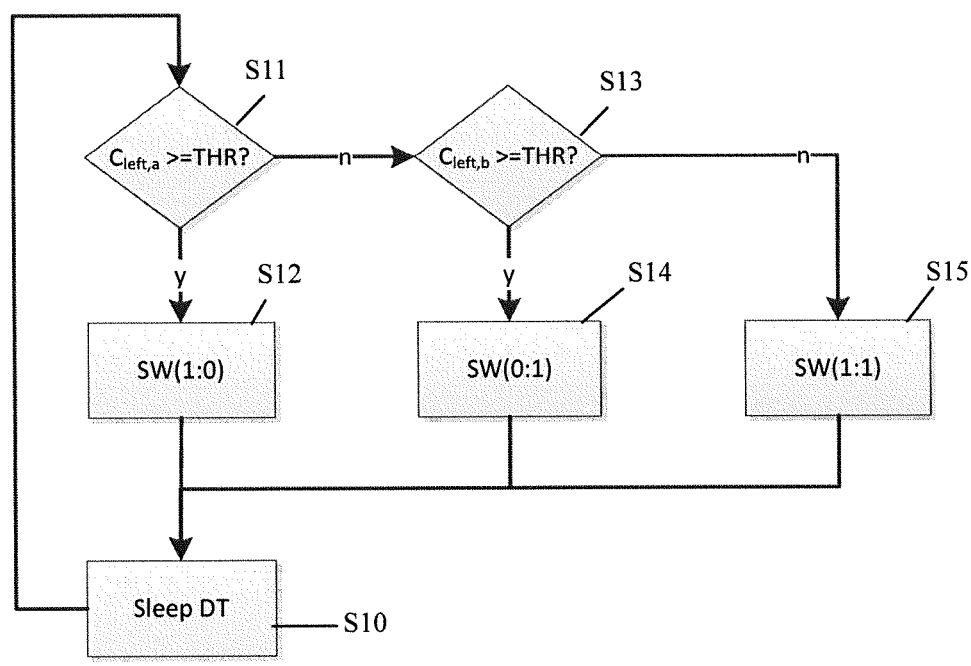
FIG. 4 illustrates one example scheduling algorithm according to one embodiment of the present invention.

An example scheduling algorithm according to the present invention is shown in FIG. 4. In which for illustration purpose two tunnels (tunnel a and tunnel b) are available. The scheduling algorithm starts at step S10 with sleep $D_T$, i.e. waiting for the slot time $D_T$. If a packet is to be sent the scheduling algorithm checks at step S11 if the leftover capacity of tunnel a $C_{left,a}$ is equal to or larger than a predetermined threshold value (THR). If the leftover capacity of tunnel a $C_{left,a}$ is equal to or larger than the predetermined threshold value the scheduling algorithm will send the packet through tunnel a at step S12, which in this example has a scheduling weight of SW(1:0), and return to the starting point (step S10) and the procedure is repeated for another slot. Here SW(1:0) means that one packet is send via tunnel a and no packet is send via tunnel b. That is, only packets via tunnel a are send and for this example $W_R$ is infinite and $W_H$ is 1. If however, the leftover capacity of tunnel a $C_{left,a}$ is not equal to or larger than the predetermined threshold value the scheduling algorithm will determine if the leftover capacity of tunnel b $C_{left,b}$ is not equal to or larger than the predetermined threshold value (THR) in step S13. It should be appreciated that the threshold values for tunnel a and tunnel b do not necessarily need to be equal but can also be different threshold values.

If the leftover capacity of tunnel b $C_{left,b}$ is equal to or larger than the predetermined threshold value the scheduling algorithm will send the packet through tunnel b at step S14, which in this example has a scheduling weight of SW(0:1), and return to the starting point (step S10) and the procedure is repeated for another slot. If however, the leftover capacity of tunnel b $C_{left,b}$ is not equal to or larger than the predetermined threshold value the scheduling algorithm will determine that none of the tunnels have leftover capacity the scheduling algorithm will send the packet at step 15, which in this example has a scheduling weight of SW(1:1), and return to the starting point at step S10 and the procedure is repeated for another slot.

In other words, tunnel a is the priority tunnel and in case that it has free capacity, packets are send over this tunnel a only. In case tunnel a has no free capacity, packets are send over tunnel b in case tunnel b has free capacity. In case both links do not have free capacity a round robin scheduling is performed.

Even if described within the context of network-layer approach, the person skilled in the art will appreciate that the present invention might also be applied in other bundling approaches, e.g. MPTCP. However, by using the described network-layer approach (layer 3) no new TCP protocol may be required. Thus, standard TCP protocols may be used.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

A single unit may fulfil the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for packet-based scheduling for Transmission Control Protocol (TCP) sessions or User Datagram Protocol (UDP) sessions, wherein the system comprises:
 a first bonding module comprising a first scheduling module and at least two links connected to at least one transport network, wherein the first bonding module is configured to be connected to a user device, wherein for each link connecting the first bonding module to the at least one transport network, a respective TCP tunnel is configured between the at least one transport network and a second bonding module, and wherein the first scheduling module is configured to schedule and distribute data packets via the TCP tunnels towards the second bonding module; and the second bonding module comprising a second scheduling module, wherein the second bonding module is connected to the at least one transport network via the TCP tunnels, wherein the second bonding module is configured to be connected to a server, and wherein the second scheduling module is configured to schedule and distribute data packets via the TCP tunnels towards the first bonding module;

wherein the first scheduling module and/or the second scheduling module is configured to estimate the capacity of the at least two links using native information from the TCP tunnels and without using a path monitor;

wherein the native information of the TCP tunnels comprises:
the size of the Congestion Window $C_{cwnd}$;
a TCP slowstart threshold $S_{thresh}$;
a smoothed Round Trip Time $T_{RTT}$;
a number of packets that have been send out $P_{out}$;
a number of packets that have been acknowledged $P_{sacked}$;
a number of packets that have been re-transmitted $P_{retrans}$; and/or
a number of packets considered to be lost $P_{lost}$.

2. The system of claim 1, wherein the first router is connected to the first bonding module through a wired or wireless connection.

3. The system of claim 1, wherein the second router is connected to the second bonding module through a wired or wireless connection.

4. The system of claim 1, wherein the first scheduling module and/or the second scheduling module is configured to obtain a number of packets currently travelling from the first router to the second router as $P_{fly}=P_{out}-P_{sacked}+P_{retrans}-P_{lost}$.

5. The system of claim 4, wherein the first scheduling module and/or the second scheduling module is configured to obtain a leftover capacity as $C_{left}=C_{cwnd}-P_{fly}$.

6. The system of claim 5, wherein the first scheduling module and/or the second scheduling module is configured to obtain changes of the leftover capacity $\Delta C_{left}$ within a defined interval.

7. The system of claim 1, wherein the first scheduling module and/or the second scheduling module is configured to use a scheduling algorithm to obtain scheduling weights for the TCP tunnels between the first router and the second router.

8. The system of claim 7, wherein the scheduling weights comprise the ratio of the amount of packets sent via each of the tunnels and/or the amount of packets sent over each of the tunnels in a row.

9. The system of claim 8, wherein the first scheduling module and/or the second scheduling module is configured to adapt scheduling weights continuously or in timeslots.

10. A method for packet-based scheduling for Transmission Control Protocol (TCP) sessions or User Datagram Protocol (UDP) sessions, wherein the method comprises:
connecting a first bonding module comprising a first scheduling module and at least two links connected to at least one transport network, wherein the first bonding module is configured to be connected to a user device; configuring, for each link connecting the first bonding module to the at least one transport network, a respective TCP tunnel between the at least one transport network and a second bonding module; and scheduling and distributing data packets via the TCP tunnels and the at least one transport network from the first bonding module towards the second bonding module; and
connecting the second bonding module comprising a second scheduling module, wherein the second bonding module is connected to the at least one transport network via the TCP tunnels, and wherein the second bonding module is configured to be connected to a server; and scheduling and distributing data packets via the TCP tunnels from the second bonding module towards the first bonding module;
wherein the method further comprises: estimating the capacity of the at least two links using native information from the TCP tunnels and without using a path monitor;
wherein the native information of the TCP tunnels comprises:
the size of the Congestion Window $C_{cwnd}$;
a TCP slowstart threshold $S_{thresh}$;
a smoothed Round Trip Time $T_{RTT}$;
a number of packets that have been send out $P_{out}$;
a number of packets that have been acknowledged $P_{sacked}$;
a number of packets that have been re-transmitted $P_{retrans}$; and/or
a number of packets considered to be lost $P_{lost}$.

11. The method of claim 10, wherein the method further comprises:
connecting the first router to the first bonding module through a wired or wireless connection.

12. The method of claim 10, wherein the method further comprises:
connecting the second router to the second bonding module through a wired or wireless connection.

13. The method of claim 10, wherein scheduling and distributing data packets is based on a scheduling algorithm to obtain scheduling weights for the TCP tunnels between the first router and the second router.

14. The method of claim 13, wherein the scheduling weights comprise the ratio of packets sent via each of the tunnels and/or the amount of packets sent over each of the tunnels in a row.

15. The method of claim 14, wherein the scheduling weights are adapted continuously or in timeslots.

* * * * *